United States Patent Office 3,492,272
Patented Jan. 27, 1970

3,492,272
POLYMERIC BICYCLOHEXYL - 4,4' - DIMETHYL-
ENE-4,4'-BIBENZOATES AND RELATED LINEAR
POLYMERS
Robert G. Thompson, Kinston, N.C., assignor to E. I. du
Pont de Nemours and Company, Wilmington, Del., a
corporation of Delaware
No Drawing. Original application Mar. 13, 1963, Ser. No.
264,783, now Patent No. 3,467,719, dated Sept. 16,
1969. Divided and this application Oct. 18, 1965, Ser.
No. 509,245
Int. Cl. C08g 17/08, 20/30
U.S. Cl. 260—75
11 Claims

ABSTRACT OF THE DISCLOSURE

The application discloses a class of glycols containing two hydroxycyclohexyl groups, and linear condensation polymers prepared therefrom which are characterized by recurring units of the formula

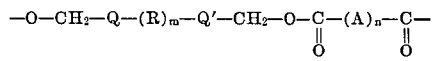

wherein $m$ and $n$ are 0 or 1, Q and Q' are 1,3- or 1,4-cyclohexylene or alkyl derivatives thereof, R is an alkylene radical, and A is an arylene, aralkylene or cycloalkylene radical preferably containing two 6-membered carbocyclic nuclei. Polyesters and polyesteramides particularly suitable for textile fibers are illustrated.

---

This is a division of my application Ser. No. 264,783, filed Mar. 13, 1963, which is a continuation-in-part of my application Serial No. 187,982 filed Apr. 16, 1962, and now abandoned. The invention relates to a novel class of alicyclic glycols of high molecular weight. More particularly, it relates to glycols containing at least 14 carbon atoms and characterized by the presence of two hydroxymethylcyclohexyl groups. The invention also comprehends novel esters, including polyesters and polyesteramides, prepared from the glycols, as well as to fibers, films, and other shaped articles produced from the polymers.

In general, the present invention comprehends glycols and esters thereof wherein the glycol contains two hydroxymethylcyclohexyl groups, any additional constituents of the glycol being selected from the class consisting of ether oxygen and saturated hydrocarbon groups having a total of up to 8 carbon atoms, including the class of bis(hydroxymethylcyclohexyl)alkanes having up to 22 total carbon atoms and esters thereof.

It has now been found that these glycols can be prepared readily and that they have excellent utility for reaction with dicarboxylic acids or ester-forming derivatives thereof to prepare linear condensation polyesters or polyesteramides. The noved polyesters are characterized by generally high melting points and are particularly adapted for the preparation of fibers, films, tapes, and the like as well as other shaped articles obtained by using the polyesters as molding compositions.

One embodiment of the invention comprises glycols containing two 2-(hydroxymethyl)cyclohexyl groups, any additional constituents of the glycol being selected from the class consisting of ether oxygen and saturated hydrocarbon groups having a total of up to 8 carbon atoms. Polyesters and polyesteramides prepared from these glycols or their esters are especially useful for forming films, molded articles, and the like.

Another embodiment of the invention comprises the class of glycols having the general formula:

$$HOCH_2—Q—(R)_m—Q'—CH_2OH$$

wherein Q and Q' are saturated divalent hydrocarbon radicals of the group consisting of 1,3-cyclohexylene, 1,4-cyclohexylene, and lower alkyl derivatives thereof; $m$ is 0 or 1; and R is a saturated divalent hydrocarbon radical of 1 to 8 carbon atoms. Preferably a chain of carbon atoms connecting the said Q and Q' radicals contains not more than 4 carbon atoms. R may therefore represent any alkylene radical of up to 8 carbon atoms, either straight chain, branched chain, or cyclic. Polyesters or polyesteramides prepared from these glycols or their esters are useful not only for films and molded articles but also are especially useful for forming fibers. A preferred class of glycols, particularly useful as components of such fiber-forming polymers, are the bis(4-hydroxymethylcyclohexyl)alkanes of up to 22 carbon atoms represented by the formula:

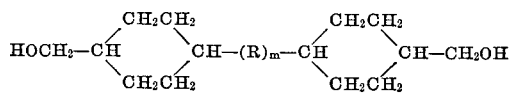

wherein $m$ and R are defined as above.

A useful general method for obtaining the novel glycols comprises a two-stage reduction of the corresponding bibenzoic acids or bis(carboxyphenyl)alkanes or ethers, involving reduction of the aromatic (benzene) nuclei to alicyclic (cyclohexane) nuclei followed by reduction of the carboxyl groups to hydroxymethyl groups. Reduction of the benzene nuclei is conveniently achieved by hydrogenation of an ester of the acid using platinum oxide or ruthenium as a catalyst; while reduction of the carboxylate groups of the resulting alicyclic ester is readily obtained by hydrogenation with a catalyst such as copper chromite or by reaction with lithium aluminum hydride. The glycol products so obtained consist in each case of a mixture of various geometrical isomers, i.e., compounds having the same carbon skeleton but occurring in various cis- and trans- forms, and, in the case of glycols having the hydroxymethyl groups in the 2- or 3-positions, occurring in syn- and anti-forms as well. It has been found that the glycol mixtures obtained in this way can be purified readily to eliminate traces of esters and other non-glycol impurities by conventional purification procedures such as recrystallization or distillation, and that the glycol products obtained in this form have excellent utility in the preparation of polyesters without separating the isomers unless it is so desired.

Examples of the novel glycols of the present invention are shown in Table I, together with the starting material acids from which they may be derived by the two-stage reduction process described above.

TABLE 1.—BIS(CARBOXYPEHNOL) COMPOUNDS AND GLYCOLS OBTAINED BY THE REDUCTION THEREOF

| | Acid | Alycol |
|---|---|---|
| 1 | 4,4'-bibenzoic acid | Bis(4-hydroxymethylcyclohexyl). |
| 2 | 3,3'-bibenzoic acid | Bis(3-hydroxymethylcyclohexyl). |
| 3 | 3,4'-bibenzoic acid | 3,4'Bis(hydroxymethyl)bicyclohexyl). |
| 4 | 2,2'-dimethyl-4,4'-bibenzoic acid. | Bis(4-hydroxymethyl-2-methylcyclohexyl). |
| 5 | 3,3'-dimethyl-4,4'-bibenzoic acid. | Bis(4-hydroxymethyl-3-methylcyclohexyl). |
| 6 | 2,2'-dimethyl-5,5'- bibenzoic acid. | Bis(3-hydroxymethyl-6-methylcyclohexyl). |
| 7 | 2,2'-di-isopropyl-5-5'-bibenzoic acid. | Bis(3-hydroxymethyl-6-isopropylcyclohexyl). |
| 8 | Bis(4-carboxyphenyl)-methane. | Bis(4-hydroxymethylcyclohexyl)methane. |
| 9 | Bis(3-carboxyphenyl)-methane. | Bis(3-hydroxymethylcyclohexyl)methane. |
| 10 | 1,1-bis(4-carboxyphenyl)ethane. | 1,1-bis(4-hydroxymethylcyclohexyl)ethane. |
| 11 | 1,2-bis(4-carboxyphenyl)ethane. | 1,2-bis(4-hydroxymethanylcyclohexyl)ethane. |
| 12 | 1,2-bis(3-carboxyphenyl)ethane. | 1,2-bis(3-hydroxymethylcyclohexyl)ethane. |
| 13 | 2,2-bis(4-carboxyphenyl)propane. | 2,2-bis(4-hydroxymethylcyclohexyl)propane. |
| 14 | 1,3-bis(4-carboxyphenyl)propane. | 1,3-bis(4-hydroxymethylcyclohexyl)propane. |
| 15 | 1,4-bis(4-carboxyphenyl)butane. | 1,4-bis(4-hydroxymethylcyclohexyl)butane. |
| 16 | 1,1-bis(4-carboxyphenyl)butane. | 1,1-bis(4-hydroxymethylcyclohexyl)butane. |
| 17 | 1,1-bis(3-carboxyphenyl)butane. | 1,1-bis(3-hydroxymethylcyclohexyl)butane. |
| 18 | 1,2-dimethyl-1,2-bis(4-carboxyphenyl)butane. | 1,2-dimethyl-1,2-bis(4-hydroxymethylcyclohexyl)butane. |
| 19 | 3,3-bis(3-carboxyphenyl)-pentane. | 3,3-bis(3-hydroxymethylcyclohexyl)pentane. |
| 20 | 3,4-dimethyl-3,4-bis-(4-carboxyphenyl)hexane. | 3,4-dimethyl-3,4-bis(4-hydroxy-methylcyclohexyl)-hexane. |
| 21 | 4,4''-p-terphenic acid | 1,4-bis(4-hydroxymethylcyclohexyl)cyclohexane. |
| 22 | 4,4''-m-terphenic acid | 1,3-bis(4-hydroxymethyl.cyclohexyl)cyclohexane. |
| 23 | Bis(4-carboxyphenyl)ether | Bis(4-hydroxymethylcycloheyl)ether. |
| 24 | Bis(4-carboxyphenoxy)-ethane. | Bis(4-hydroxymethylcyclohexyloxy)ethane. |
| 25 | Bis(4-carboxyphenoxy)-butane. | Bis(4-hydroxymethylcyclohexyloxy)butane. |
| 26 | 2,8-dibenzofurandicarboxylic acid. | 2,8-bis(hydroxymethyl)dodecahydrodibenzofuran. |
| 27 | Diphenic acid | Bis(2-hydroxymethylcyclohexyl). |
| 28 | 2,3'-bibenzoic acid | 2,3'-bis(hydroxymethyl)bicyclohexyl. |
| 29 | 2,4'-bibenzoic acid | 2,4'-bis(hydroxymethyl)bicyclohexyl. |
| 30 | 3,4'-dimethyl-2,2'-bibenzoic acid. | 3,4'-dimethyl-bis(2-hydroxymethylcyclohexyl). |
| 31 | 4,4'-dimethyl-2,2'-bibenzoic acid. | Bis(2-hydroxymethyl-4-methylcyclohexyl). |
| 32 | 5,5'-dimethyl-2,2'-bibenzoic acid. | Bis(2-hydroxymethyl-5-methylcyclohexyl). |
| 33 | 3,3'-dimethyoxy-4,4'-bibenzoic acid. | Bis(4-hydroxymethyl-3-methoxy-cyclohexyl). |
| 34 | 5,5'-dimethyoxy-2,2'-bibenzoic acid. | Bis(2-hydroxymethyl-5-methoxycyclohexyl). |
| 35 | 6-ethyl-2,2'-bibenzoic acid | 6-ethyl-bis(2-hydroxymethylcycloexyl). |
| 36 | 4'-isopropyl-3-methyl-2,2'-bibenzoic acid. | 4'-isopropyl-3-methyl-bis(2-hydroxymethylcyclohexyl). |
| 37 | 2,2'-diphenylmethane-di-dicarboxylic acid. | Bis(2-hydroxymethylcyclohexyl)-methane. |
| 38 | 2,4'-diphenylmethane-dicarboxylic acid. | 2,4'-bis(hydroxymethylcyclohexyl)methane. |
| 39 | 4,4'-dimethoxy-3,3'-diphenylmethanedicarboxylic acid. | Bis(3-hydroxymethyl-4-methoxy-cyclohexyl)mehtane. |
| 40 | 1,2-bis(2-carboxy-phenyl)-ethane. | 1,2-bis(2-hydroxymethylcyclohexyl)ethane. |
| 41 | 1,2-Bis(2-carboxy-6-methyl-phenyl)ethane. | 1,2-bis(2-hydroxymethyl-6-methylcyclohexyl)ethane. |
| 42 | 2,2-bis(2-carboxy-phenyl)-butane. | 2,2-bis(2-hydroxymethylcyclohexyl)butane. |

Although the glycol products obtained from the two-stage reduction sequence can be employed directly in the preparation of polyesters, it has been found that specific geometrical isomers can be prepared and also that an isomerization step can be provided to alter the ratio of the various isomers contained in the product. In the case of bis(4-hydroxymethylcyclohexyl), for example, it has been found that hydrogenation of dimethyl 4,4'-bibenzoate yields a mixture of three isomeric dimethyl dodecahydro-4,4'-bibenzoates. Recrystallization of the isomeric ester mixture from 90% methanol/10% water yields a first crop of relatively pure crystals of one of the geometrical isomers of dimethyl dodecahydro-4,4'-bibenzoate, exhibiting a melting point of 98° C. Reduction of this isomer of the ester with lithium aluminum hydride produces a single pure geometrical isomer of the glycol, designated herein as "c,c"-bis(4-hydroxymethylcyclohexyl), having a melting point of 123° C. and yielding a dibenzoate ester having a melting point of 113° C. This isomer is illustrated by the following structural formula in which each of the hydroxymethyl groups is cis to the bond connecting the two cyclohexane rings:

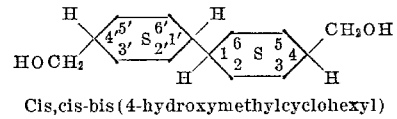

Cis,cis-bis(4-hydroxymethylcyclohexyl)

wherein the carbon atoms in the 1, 1', 4, and 4' positions as well as the hydrogen atoms attached to these positions and the carbon atoms of the hydroxymethyl groups lie in the plane of the paper, the 2, 2', 3, and 3' carbon atoms are situated above the plane of the paper, the 5, 5', 6, and 6' carbon atoms are situated below the plane of the paper, and the symbol s indicates that the ring is saturated (i.e., that the 6-membered ring is a cyclohexane ring).

As described above, hydrogenation of dimethyl 4,4'-bibenzoate to a mixture of dimethyl dodecahydro-4,4'-bibenzoates followed by recrystallization results in separation of quantities of one of the pure isomers (M.P. 90° C.). Saponification of the esters remaining in the mother liquor to the sodium salts of the mixed acids yields a solution from which part of the remaining product can be salted out as a relatively pure isomer. The salted-out product, when esterified with methanol, yields a geometrical isomer of dimethyl dodecahydro-4,4'-bibenzoate melting at 116° C., differing from the isomeric ester melting at 98° C. described above. Reduction of the ester melting at 116° C. with lithium aluminum hydride produces a pure geometrical isomer of the glycol, designated herein as "t,t"-bis(4-hydroxymethylcyclohexyl), which has a melting point of 184° C. and yields a dibenzoate ester having a melting point of 127° C. This isomer is illustrated by the following structural formula in which each of the hydroxymethyl groups is trans to the bond connecting the two cyclohexane rings:

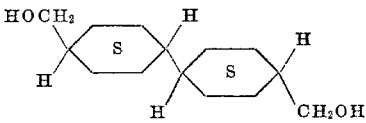

Trans,trans-bis(4-hydroxymethylcyclohexyl)

wherein each of the symbols is employed as previously defined.

From the residual liquid remaining after the salting out procedure described above in working up the mixture of dodecahydro-4,4'-bibenzoates is obtained a mixed acid which, when recrystallized from aqueous acetic acid and esterified with methanol, yields the third isomer of dimethyl dodecahydro-4,4'-bibenzoate in 80% purity. Reduction of this ester with lithium aluminum hydride, followed by repeated recrystallizations from aqueous ethanol and then from ethyl acetate, produces a pure geometrical isomer of the glycol, designated herein as "c,t"-bis(4-hydroxymethylcyclohexyl), which has a melting point of 135° C. and yields a dibenzoate ester having a melting point of 76° C. This isomer is illustrated by the following structural formula in which one of the hydroxymethyl groups is cis to the bond connecting the two cyclohexane rings and the other is trans:

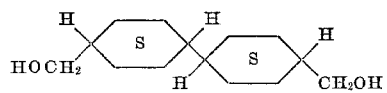

Cis,trans-bis(4-hydroxymethylcyclohexyl)

It has been found that the preparation of the "t,t"-bis-(4-hydroxymethylcyclohexyl) isomer is greatly facilitated by saponifying the crude hydrogenation product comprising the three isomeric dimethyl dodecahydro-4,4'-bibenzoates to the corresponding mixture of isomeric acids, followed by heating the mixed acids at 300° C. in vacuum. The acids are isomerized substantially completely to the isomer of the acid most stable to heat; and upon esterification of the acid and reduction with lithium aluminum hydride it is found that the "t,t"-isomer of the glycol is obtained. By this process high yields are obtained in the coversion of the 4,4'-bibenzoate starting material to "t,t"-bis-(4-hydroxymethylcyclohexyl).

Similarly, other mixtures of alicyclic acid isomers obtained as intermediates in the preparation of the novel glycols of the invention may be isomerized with aid of heat to the most stable isomer, normally the trans, trans-isomer, as a step in the production in high yield of the corresponding pure geometrical isomer of the glycol. For instance, dodecahydro - 1,2 - bis(4-carboxphenyl)ethane may be heated to 300° C. in vacuum, followed by esterification of the acid and reduction with lithium aluminum hydride, to form a pure geometrical isomer of the corresponding glycol, designated herein as "t,t"-1,2-bis(4-hydroxymethylcyclohexyl)ethane, which has a melting point of 167° C. and forms a dibenzoate ester having a melting point of 109° C. This isomer is illustrated by the following structural formula:

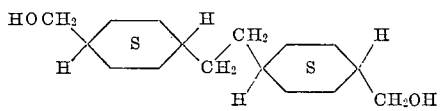

Trans,trans-1,2-bis(4-hydroxymethylcyclohexyl)ethane

The novel polymers of the invention, in its broadest scope, comprise solid linear condensation polymers of a dicarboxylic acid and a glycol containing two hydroxymethylcyclohexyl groups, any additional constituents of the glycol being selected from the class consisting of ether oxygen and saturated hydrocarbon groups having a total of up to 8 carbon atoms. More specifically, the polymer may be composed of a dicarboxylic acid and at least one bifunctional compound reactive with dicarboxylic acids to form linear condensation polymers, at least 50 mol percent of said bifunctional compound consisting of said glycol containing two hydroxymethylcyclohexyl groups. The remainder of the bifunctional component may be another dihydroxy compound, a diamine, a hydroxyacid, a hydroxyamine, or an aminoacid. When more than one bifunctional component is reacted with the dicarboxylic acid, the resulting interpolymer may be either random or segmented ("block") interpolymer. The dicarboxylic acid, which may contain up to about 26 carbon atoms, preferably contains at least one 6-membered carbocyclic nucleus and the shortest chain of carbon atoms connecting the two carboxyl groups preferably includes at least three cyclic carbon atoms of the nucleus.

A preferred embodiment of the invention comprises polyesters characterized by possessing recurring units of the following formula:

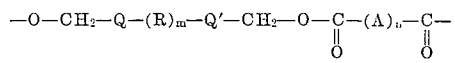

in which $n$ is 0 or 1, A is a divalent organic radical corresponding to the radical A in the starting material dicarboxylic acid, $A(COOH)_2$, and the other symbols are employed as previously defined. Preferably, A contains from 6 to 24 carbon atoms including at least one 6-membered carbocyclic nucleus, and the carboxyl groups are separated by a chain of at least three nuclear carbon atoms. Thus, A may be an arylene, aralkylene, or cycloalkylene radical of 6 to 24 carbon atoms derived from the dicarboxylic acid of the formula $A(COOH)_2$, the carboxyl groups being attached in positions other than ortho positions on the ring.

The starting material dicarboxylic acids from which the polyesters are prepared may be in the form of their ester-forming derivatives, i.e., their carbonyl halides, anhydrides, salts, or esters, particularly their esters with the lower aliphatic alcohols or with phenol. 4,4'-Bibenzoic acid is an example of a dicarboxylic acid which may be used with the novel glycols to form polyesters; and this acid is indeed particularly preferred for the purpose of producing polyesters suitable for spinning textile filaments. Other examples of suitable acids include 2,2'- and 3,3'-dimethyl-4,4'-bibenzoic acid, 2,2'-dibromo-4,4'-bibenzoic acid, bis-(4-carboxyphenyl)-methane, 1,1- and 1,2 - bis(4-carboxyphenyl)ethane, 2,2 - bis(4-carboxyphenyl)propane, 1,2 - bis(4-carboxyphenoxy)ethane, bis-4-carboxyphenyl ether, bis-4-carboxyphenyl sulfide bis-4-carboxyphenyl ketone, bis-4-carboxyphenyl sulfoxide, bis-4-carboxyphenyl sulfone, 2,8-dibenzofurandicarboxylic acid, terephthalic acid, methylterephthalic acid, 2,5- or 2,6-dimethylterephthalic acid, chloroterephthalic acid, 2,5-dichloroterephthalic acid, fluoroterephthalic acid, isophthalic acid, the naphthalenedicarboxylic acids and especially the 1,4- 1,5-, 2,6-, and 2,7- isomers, oxalic acid, phenylenediacetic acid, 4-carboxyphenoxyacetic acid, m- and p-terphenyl - 4,4''-dicarboxylic acid, dodecahydrobibenzoic acid, 1,1 - bis(4-carboxyphenyl)cyclohexane, hexahydroterephthalic acid, 4,4'-stilbenedicarboxylic acid, and octadecahydro-m-terphenyl-4,4''-dicarboxylic acid. The divalent A radical is preferably composed primarily of carbon and hydrogen but may contain, in addition to the two carboxyl groups, other non-hydrocarbon components or substituents which are inert in the polyesterification reaction. For example, halogen substituents may be present. The radical A may also be a chalkogen-containing radical wherein each chalkogen atom is bonded to carbon or a different chalkogen atom, and no carbon is bonded to more than one chalkogen atom. Thus, the repeating units may contain ether, carbonyl, sulfide, sulfoxide, or sulfonyl radicals. Mixtures of the dicarboxylic acids may be employed.

The polyesters of the invention are prepared by reacting a dicarboxylic acid or an ester-forming derivative thereof, as described above, with one of the novel cycloalkylene glycols of the invention, i.e., bis(hydroxymethylcyclohexyl) or a bis(hydroxymethylcyclohexyl)alkane or ether, or an ester-forming derivative of the desired glycol. By an ester-forming derivative of the glycol is meant a derivative of the novel glycol containing functional groups equivalent to the hydroxyl groups in their ability to react with carboxl groups, such as esters of the glycol with acetic acid or other lower aliphatic acids.

A convenient method for preparing the polymers involves reaction of an alkyl ester of a dicarboxylic acid with one of the novel cycloalkylene glycols in an ester interchange reaction followed by polycondensation at high temperature and at low partial pressure of the glycol, until a polymer of the desired molecular weight is produced. In carrying out the ester interchange reaction, at least one molecular proportion of the novel cycloalkylene glycol per molecular proportion of the dicarboxylic ester should be used, preferably about 1.5 to 1.8 mols of the glycol per mol of the ester. It is desirable to employ an ester of the dicarboxylic acid formed from an alcohol or a phenol with a boiling point considerably below that of the novel cycloalkylene glycol so that the former can be removed easily from the reaction zone by distillation. It is preferred to use the methyl or ethyl esters, as these esters are formed from alcohols which, because of their relatively low boiling points, are easily separated by distillation from the glycol. Heating should be above the melting point of the reaction mixture and above the boiling point of the alcohol or phenol to be displaced. Heating should be effected under conditions such that the displaced alcohol or phenol can be removed from the reaction zone, usually by means of conventional distillation equipment. The heating is usually at atmospheric pressure, but higher or lower pressures may be used if desired. The ester interchange reaction is advantageously carried out in the presence of ester interchange catalysts such as manganous acetate, calcium acetate, litharge, sodium methoxide, sodium hydrogen hexabutoxytitanate, tetra-alkyl titanates such as tetraisopropyl titanate, or other suitable ester interchange catalysts as described in the literature relating to preparation of polyesters.

Following the ester interchange reaction, heating is continued under reduced pressure until the excess glycol is removed and the polymerization reaction has proceeded to the desired degree. The final stages of polymerization may be carried out with polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

As used herein the term "polyester" is intended to include not only homopolyesters but also copolyesters, terpolyesters, and the like.

While the preferred embodiment of the invention comprises polyesters in which all, or substantially all (i.e., greater than 90%), of the recurring structural units consist of esters of dicarboxylic acids with a bis(hydroxymethylcyclohexyl) or a bis(hydroxymethylcyclohexyl)alkane, or ether, particularly with bis(4-hydroxymethylcyclohexyl) or a bis(4-hydroxymethylcyclohexyl)alkane, it is to be understood that the invention also comprises polyesters in which residues of other hydroxy compounds are present. In general, at least about 50 mol percent of the hdroxy component of the polyester should be a bis-(hydroxymethylcyclohexyl), a bis(hydroxymethylcyclohexyl)alkane, or mixtures thereof, although of course smaller proportions can be employed. By "hydroxy component" of the polyester is meant the sum of all the hydroxy-substituted compounds which would be formed by hydrolysis of the carbonyloxy linkages in the polymer chain. The remainder of the hydroxy component of the polyester, up to about 50 mol percent, may be any suitable dihydroxy compound of hydroxycarboxylic acid. Examples of such compounds include ethylene glycol, propylene glycol, butylene glycol, 2,2-dimethylpropylene glycol, 2-methyl-2-ethylpropylene glycol, 2 - methyl - 2 - propylpropylene glycol, 2,2,3,3,4,4-hexafluoro-1,5-pentanediol, hexamethylene glycol, decamethylene glycol, diethylene glycol, ethylene thiodiglycol, cis- or trans-hexahydro-p-xylylene glycol, cis- or trans-quinitol, decahydro-1,4-, -1,5-, -2,6-, or -2,7-bis(hydroxymethyl)naphthalene, 1,1-bis(hydroxymethyl)cyclohexane, 4-(2 - hydroxyethyl)benzoic acid, and 4-(2-hydroxyethoxy)benzoic acid.

The remainder of the hydroxy component may also be a dihydric phenol. A convenient method of preparing such copolyesters involves (A) preparation of a homopolyester of one of the novel cycloalkylene glycols of the invention and a dicarboxylic acid as described above, (B) preparation of a homopolyester of the dihydric phenol with the dicarboxylic acid, e.g. by reacting the dihydric phenol with the diphenyl ester of the acid in the presence of sodium acetate as a catalyst, and (C) melt blending the glycol polyester and the dihydric phenol polyester in the desired proportions under an atmosphere of nitrogen. The blended mixture initially forms a block copolyester, but if the mixture is held an hour or so in the melt the copolyester becomes random. The catalysts present in the homopolyester also serve as catalysts for the randomization of the copolyester. Suitable dihydric phenols for the preparation of such copolyesters include hydroquinone, resorcinol, 4,4'-dihydroxybiphenyl, 3,3'-dibromo-4,4'-dihydroxybiphenyl, bis(4 - hydroxyphenyl) methane, 2,2-bis(4-hydroxyphenyl)propane, 2,2-bis(3,5-dichloro-4 - hydroxyphenyl)propane, bis(4-hydroxyphenyl) ether, bis(4-hydroxyphenyl) sulfone, bis(4-hydroxyphenyl) ketone, and bis(4-hydroxyphenyl) sulfoxide.

Hydrocarbons substituted with two hydroxy groups, or substituted with one hydroxy group and one carboxylic acid group, are normally preferred as copolymeric hydroxy components; however, halogen or chalkogen substituents or radicals may also be present, as described above with respect to the dicarboxylic acid. A minor amount of a dicarboxylic acid or a hydroxy component carrying a metallic sulfonate salt, carboxylate salt, phosphonate salt, or the like may also be present.

Polyesteramides may be formed in accordance with the present invention from a dicarboxylic acid and a mixture of bifunctional compounds including at least one diamine or aminocarboxylic acid, at least 50 mol percent of said mixture of bifunctional compounds comprising the novel glycol containing two hydroxymethylcyclohexyl groups as defined above. Since more than two monomeric ingredients are involved in the preparation of the polyesteramides, variations in the preparation of these interpolymers will be apparent. For example, instead of polymerizing a mixture of the various monomers, a mol of a diamine may be pre-reacted with two mols of a half ester, half acid chloride of dicarboxylic acid and the resulting amide-diester may be reacted, with or without the addition of another diester, with the novel glycol. Preferred bifunctional compounds in which at least one of the functional groups is an amine group are those in which the amine group is attached to a saturated carbon atom. Suitable examples include hexamethylenediamine, ethylenediamine, bis(4 - aminocyclohexyl)methane, p-xylylenediamine, 3-amino-2,2-diphenylpropanol, hydroxyethylamine, 6-aminocaproic acid, and p-aminomethylbenzoic acid.

Either copolyesters or polyesteramides may be prepared in segmented form rather than in random form in accordance with the present invention. Such "block" polymers are suitably prepared by melt blending a polyester of a dicarboxylic acid and the novel glycol containing two hydroxymethylcyclohexyl groups with a separately prepared second polyester, or with a separately prepared polyamide, until an interpolymer is formed; and then cooling the segmented interpolymer before the order of the recurring structural units becomes substantially random through further ester interchange or ester-amide interchange reactions.

The melt stability of the segmented interpolymer is greatly enhanced by selecting the polymers to be melt blended such that at least one of them undergoes such interchange reactions only quite slowly. Polyesters derived from a sterically hindered glycol or acid, such as 2,5-dimethylterephthalic acid, 2,2 - dimethyl-1,3-propanediol, 2,2,5,5,-tetramethyladipic acid, 2,2,5,5,-tetramethylhexamethylene glycol or 2,2,4,4-tetramethyl-1,3-cyclobutylene glycol, have the required low rate of interchange reactivity to form melt-stable segmented interpolymers with other polyesters or with polyamides.

Within the broad range of useful polymers, including lower melting polyesters suitable for molding compositions, it is generally considered that those polyesters melting above about 200° C. and as high as about 325° C. are especially advantageous for extrusion in unmodified form to produce fibers and films. Many of the novel polyesters of this invention are even higher melting and are especially adapted for high temperature applications, e.g., for use in electrical tapes and in the manufacture of insulators for electric motors, etc. Extrusion or shaping of the higher melting polyesters is generally facilitated by the use of plasticizers, especially by plasticizers such as 1,2-diphenoxyethane or p-toluenesulfonamide which may be removed from the shaped polyester article by leaching with water or other solvent, or by heating at a temperature sufficient to drive off the plasticizer. Polyesters having an intrinsic viscosity of at least about 0.2 are considered to be of sufficiently high molecular weight for utility in forming molded articles as well as films. For use in extruding fibers and filaments, polycondensation is usually continued until the intrinsic viscosity is at least about 0.3.

The following examples will serve to describe the preparation of bis(4-hydroxymethylcyclohexyl) and other bis-(4-hydroxymethylcyclohexyl)alkanes, including separation of certain of the pure geometrical isomers and selective methods for preparing certain specific geometrical isomers, as well as typical polymers and copolymers derived therefrom. The examples are not intended to be limitative.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., N.Y., pages 49–50 (1961).

EXAMPLE 1

Preparation of bis(hydroxymethylcyclohexyl) isomers (A) *Hydrogenation of dimethyl 4,4'-bibenzoate.*—To a solution of 30 g. of dimethyl 4,4'-bibenzoate in 150 cc. of acetic acid is added 0.5 g. of finely-divided platinum oxide (Adams' Catalyst), after which the mixture is hydrogenated on a Parr shaker for 6 hours at 45° C. under an atmosphere of 50 p.s.i. of hydrogen. The catalyst is then filtered off and the acetic acid is neutralized by adding aqueous sodium carbonate. The product is dimethyl dodecahydro-4,4'-bibenzoate, a solid of low melting point.

(B) *Alternative hydrogenation procedures.*—Hydrogenation of dimethyl 4,4'-bibenzoate in dioxane solution is carried out as in part A, except that ruthenium oxide is substituted for the platinum oxide and high pressure apparatus is used (hydrogen at 5000 p.s.i.). A low melting ester product, dimethyl dodecahydro-4,4'-bibenzoate, is obtained.

Similarly, dipotassium 4,4'-bibenzoate may be hydrogenated in aqueous solution at 5000 p.s.i. to form dipotassium dodecahydro-4,4'-bibenzoate; or an aqueous slurry of bibenzoic acid may be hydrogenated to form dodecahydrobibenzoic acid.

(C) *Trans,trans - dimethyl dodecahydro - 4,4'-bibenzoate.*—Ninety g. of dimethyl dodecahydro-4,4'-bibenzoate, prepared as described in part A, is dissolved in 500 cc. of methanol and 200 cc. of water. To the solution is added 80 g. of sodium hydroxide, after which the solution is refluxed overnight. The reaction mixture is worked up by distilling off the methanol and acidifying the aqueous solution with concentrated hydrochloric acid. The solid so obtained, dodecahydro-4,4'-bibenzoic acid, is washed and dried, the yield being 84 g. The acid melts over a wide range, 220–350° C.

The acid is isomerized by placing it in a container under a vacuum of 15 mm. of mercury and heating it for one hour at 250° C., then for two hours at 300° C. The resulting product has a melting point of 355° C.

A solution of 84 g. of the isomerized acid in 800 cc. of methanol is refluxed overnight with 20 cc. of concentrated sulfuric acid and poured on ice, after which the product is filtered off and washed. After two recrystallizations from a mixture of 90 parts of methanol and 10 parts of water, the product melts at 116° C. Gas liquid chromatography of a sample (4 ft. column of high molecular weight polyethylene glycol wax at 250° C.) establishes that all of the material passes through in a single peak, indicating that the product is the pure geometrical isomer, trans,trans-dimethyl dodecahydro-4,4'-bibenzoate (ref.: Fichter and Holbro, Helv. Chim. Acta 21, 141, 1938).

(D) *Identification of isomeric esters.* — The ester obtained by the high pressure hydrogenation procedure of part B is subjected to gas liquid chromatography. Three peaks are observed, amounting to 60%, 35%, and 5% of the product, respectively. When pure trans,trans-dimethyl dodecahydro-4,4'-bibenzoate, prepared as described in part C, is added to the sample and another gas liquid chromatography determination is made, the third peak is enhanced. A sample of the ester product from part B is then heated for twenty-four hours with sodium methoxide in refluxing methanol. Gas liquid chromatography of the resulting ester indicates that the isomer composition has been greatly changed; the first, second, and third peaks amounting to 5%, 35% and 60%, respectively. Based on this data, the order of appearance of the peaks corresponds to the cis,cis-, cis,trans-, and trans,trans-isomers, respectively; and the esters are correspondingly designated hereinbelow as the "c,c"-, "c,t"- and "t,t"-isomers, respectively.

The ester product of part A is subjected to gas liquid chromatography and it is determined that the isomers composition is 45% "c,c"-, 45% "c,t"-, and 10% "t,t"-, based on the above designation.

(E) *"c,c"-dimethyl dodecahydro-4,4'-bibenzoate.* — A sample of dimethyl dodecahydro-4,4'-bibenzoate prepared by high pressure hydrogenation as described in part B is recrystallized from an approximately 10% solution in a mixture of 90 parts of methanol and 10 parts of water. As determined by gas liquid chromatography, the resulting crystals correspond to a pure sample of "c,c"-dimethyl dodecahydro-4,4'-bibenzoate as designated in part D above. The melting point of the ester is 98°C.

(F) *"c,t" - dimethyl dodecahydro - 4,4'-bibenzoate.* — The mother liquor remaining after separation of the "c,c"-isomeric ester in the procedure of part E is analyzed by gas liquid chromatography, and it is found that the ratio of isomers remaining in it is 20% "c,c"-, 65% "c,t"-, and 15% "t,t"-. Sodium hydroxide is added to the solution and the mixture is refluxed overnight. Sodium chloride is added to the solution and the resulting precipitate (sodium salt of the "t,t"-isomer of the acid) is filtered off. The remaining acid obatined upon acidification is recrystallized from aqueous acetic acid and the product is then esterified by refluxing overnight in methanol in the presence of concentrated sulfuric acid. The crystals obtained upon recrystallization from solution in 90 parts of methanol and 10 parts of water melt at 56° C. Gas liquid chromatography indicates that it comprises "c,t"-dimethyl dodecahydro-4-4'-bibenzoate of 80% purity.

(G) *Reduction of dimethyl dodecahydro-4,4'-bibenzoate.*—Fifty-one g. of dimethyl dodecahydro-4,4'-bibenzoate, prepared as described in part A, is dissolved in 500 cc. of ether and the solution is added dropwise to a refluxing slurry of 20 g. of lithium aluminum hydride in 500 cc. of ether. After the addition is complete, the mixture is refluxed for 24 hours. Excess hydride is then destroyed with 100 cc. of ethyl acetate added drop by drop. The mixture is cooled to −20° C. and 75 cc. of concentrated sulfuric acid is diluted with 200 cc. of water and added dropwise. After allowing the mixture to warm to room temperature, enough water is added to give a sludge and an easily decanted ether layer. The aqueous layer is extracted with ether and the combined ether extracts are evaporated, after which the resulting glycol is recrystallized from aqueous ethanol. The product, bis (4-hydroxymethylcyclohexyl), has a melting point of 100–117° C.

(H) *Geometrical isomers of bis(4 - hydroxymethylcyclohexyl).* — The procedure of part G is repeated for each of the "c,c"-, "c,t"-, and "t,t"-isomers of dimethyl dodecahydro-4,4'-bibenzoates prepared as described in parts E, F and C, respectively. The resulting glycols are given the same designation with respect to structure of the geometrical isomer as the corresponding dimethyl esters. The "c,t"-bis(4-hydroxymethylcyclohexyl) product is recrystallized from aqueous ethanol and then from ethyl acetate until a constant melting point, 135° C., is observed. The melting point of a sample of a little of the "c,t"- product is depressed to 85° C. by a little of the "c,c"- product. Listed below are the melting points of the dimethyl dodecahydro - 4,4' - bibenzoates ("dimethyl HBB") together with the melting points of the respective glycols as well as their dibenzoate derivatives (prepared by reacting them with benzoyl chloride in pyridine) and phenylurethane derivatives (prepared by reacting them with phenylisocyanate):

|  | M.P. of Isomers (° C.) | | |
|---|---|---|---|
|  | "c,c"- | "c,t"- | "t,t"- |
| Dimethyl HBB | 98 | ¹ 56 | 116 |
| Glycol | 123 | 135 | 184 |
| Glycol dibenzoate | 113 | 76 | 127 |
| Phenylurethane | 174 | 145 | 230 |

¹ 80% pure.

(*I*) *Hydrogenation procedure for reduction of dimethyl dodecahydro-4,4'-bibenzoate.* — In a stirred autoclave is placed a mixture of 1 part by weight of dimethyl dodecahydro-4,4'-bibenzoate having an isomer distribution of about 55% "c,c", 40% "c,t", and 5% "t,t"; 3.5 parts by weight of cyclohexanol as a solvent; and 0.1 part by weight of copper chromite catalyst. The autoclave is closed, the contents are stirred and brought to a temperature of 260° C., and the autoclave is pressurized with hydrogen at 4500 p.s.i.g. for 30 minutes. The contents of the autoclave are cooled, filtered to remove the catalyst, and the solvent is removed by distillation at about 120 mm. of mercury. The pressure is then lowered to about 1 mm. and a low boiling foreshot of unreacted ester is taken until the temperature of the overhead vapors reaches about 175° C. The still residue is cooled and purified by crystallization from about 8 times its weight of toluene. The solid is filtered from the slurry at about 30–35° C., and the product is air dried. The resulting bis(4-hydroxymethylcyclohexyl) melts below 100° C. and is found to be entirely free of carbomethoxy groups and to contain isomers in the approximate distribution of 54% "c,c", 39% "c,t", and 7% "t,t".

Higher temperatures, higher catalyst ratios, lower hydrogen pressures and longer reaction times than exemplified are conditions which favor a change in the isomer distribution, generally with an increase in the amount of "t,t" isomer in the glycol product.

(*J*) *Preparation of bis(3-hydroxymethylcyclohexyl).*—
Dimethyl 3,3'-bibenzoate is hydrogenated in accordance with the general procedure of part A above to produce a mixture of geometrical isomers of dimethyl dodecahydro-3,3'-bibenzoate. When the ester is subjected to gas liquid chromatography, four peaks are observed, amounting to 3%, 2%, 32%, and 63% of the product in order of appearance of the peaks. The predominant isomer, isolated as the acid by saponification and recrystallization from acetic acid, has a melting point of 264° C. The pure dimethyl ester of the predominant isomer, formed by re-esterification of the pure acid, has a melting point of 59° C. Reduction of the pure ester with lithium aluminum hydroxide in accordance with the general procedure of part G above produces a pure isomer of bis(3-hydroxymethylcyclohexyl) having a melting point of 138° C. and identified as the "c, syn, c-" isomer.

(*K*) *Preparation of bis(2-hydroxymethylcyclohexyl).*—
Dimethyl diphenate is hydrogenated in accordance with the general procedure of part A above to produce a mixture of geometrical isomers of dimethyl dodecahydrodiphenate, as shown by the appearance of four major peaks and two minor peaks when the ester mixture is subjected to gas liquid chromatography. The esters are equilibrated by heating the mixture for twenty-four hours with sodium methoxide in refluxing methanol, after which the equilibrated mixture of esters is reduced with lithium aluminum hydride in accordance with the general procedure of part G above. The product, a liquid mixture of isomers of bis(2-hydroxymethylcyclohexyl), is purified by distillation.

EXAMPLE 2

Preparation of bis(4-hydroxymethylcyclohexyl)ethane isomers

The procedure of part A of Example 1 is repeated, substituting 1,2-bis(4-carbomethoxyphenyl)ethane for dimethyl 4,4'-bibenzoate and carrying out the hydrogenation at 40° C. to produce a mixture of geometrical isomers of 1,2-bis(4-carbomethoxycyclohexyl)ethane.

The mixture of isomeric esters is recrystallized from methanol to obtain a pure geometrical isomer. Based on a gas liquid chromatography determination, the recrystallized product is designed as the "c,c"-isomer of the ester. The ester is then reduced with lithium aluminum hydride in accordance with the general procedure of part G of Example 1 to form the glycol, "c,c"-1,2-bis (4-hydroxymethylcyclohexyl)ethane.

Reduction of the mixture of isomeric esters with lithium aluminum hydride correspondingly yields a mixture of three geometrical isomers of the glycol identified as "c,c"-, "c,t"-, and "t,t"-, 1,2-bis(4-hydroxymethylcyclohexyl)ethane on the basis of gas liquid chromatography determination.

A portion of the mixture of isomeric esters is also saponified to the acid, heated, and re-esterified to the dimethyl ester in accordance with the general procedure of part C of Example 1. The resulting "t,t"-1,2-bis(4-carbomethoxycyclohexyl)ethane is then reduced with lithium aluminum hydride to form the glycol, "t,t"-1,2-bis (4-hydroxymethylcyclohexyl)ethane.

Listed below are the melting points of the 1,2-bis(4-carbomethoxycyclohexyl)ethanes ("dimethyl HB2B") together with the melting points of the respective glycols as well as their dibenzoate and phenylurethane derivatives:

|  | M.P. of Isomers (° C.) | | |
|---|---|---|---|
|  | "c,c"- | "c,t"- | "t,t"- |
| Dimethyl HB2B | 80 |  | 126 |
| Glycol | 103 |  | 164 |
| Glycol dibenzoate | 78 |  | 110 |
| Phenylurethane | 127 |  | 224 |

EXAMPLE 3

Preparation of Other Glycols (*A*) *Bis(4-hydroxymethylcyclohexyl)methane.*—Bis(4-carbomethoxyphenyl)methane is hydrogenated in accordance with the general procedure of part A, Example 1, to produce a mixture of geometrical isomers of bis(4-carbomethoxycyclohexyl)methane which is then saponified to the acid, heated, and re-esterified to the dimethyl ester by the method of part C of Example 1. On the basis of a gas liquid chromatography determination, the product is identified as a mixture of 85% of the "t,t"-isomer and 15% of the "c-t"-isomer. The predominantly "t,t"-ester is reduced with lithium aluminum hydride in accordance with the general procedure of part G of Example 1 to form the glycol, bis(4-hydroxymethylcyclohexyl)methane, M.P. 144° C. after repeated recrystallization from methanol-water. The dibenzoate derivative of the glycol melts at 124° C. and the phenylurethane derivative at 168° C.

A portion of the initial hydrogenated mixture of esters is recrystallized from methanol to obtain another pure geometrical isomer. Based on a gas liquid chromatography determination, the recrystallized product is designated as "c,c"-bis(4-carbomethoxycyclohexyl)methane, M.P. 63° C. Reduction of this ester with lithium aluminum hydride yields "c,c"-bis(4-hydroxymethlcyclohexyl)methane, M.P. 86° C. The dibenzoate of the glycol melts at 85° C.

(*B*) *2,2 - bis(4 - hydroxymethylcyclohexyl)propane.*—
2,2-bis(4-carbomethoxyphenyl)propane is hydrogenated by the method of part A of Example 1 to produce a mixture of geometrical isomers of 2,2-bis(4-carbomethoxycyclohexyl)propane which is then saponified to the acid, heated, and re-esterified in the manner of part C of Example 1 to form "t,t"-2,2-bis(4-carbomethoxycyclohexyl) propane, M.P. 105° C. Lithium aluminum hydride reduction of the "t,t"-ester yields "t,t"-2,2-bis(4-hydroxymethylcyclohexyl)propane, M.P. 122° C. The dibenzoate derivative of the glycol melts at 125° C. and the phenylurethane derivative at 154° C.

Recrystallization of a portion of the initial hydrogenated mixture of esters yields "c,c"-2,2-bis(4-carbomethoxycyclohexyl)propane, M.P. 98° C. Reduction of the ester yields "c,c" - 2,2 - bis(4 - hydroxymethylcyclohexyl) propane, M.P. 165° C. The dibenzoate of the glycol melts at 153° C.

(C) *1,3 - bis(4 - hydroxymethylcyclohexyl)propane*.— The experiment of the first paragraph of part B of this example is repeated, substituting 1,3-bis(4-carbomethoxyphenyl)propane as the starting material in place of its 2,2-isomer. The glycol product is "t,t"-1,3-bis(4-hydroxymethylcyclohexyl)propane, M.P. 109°. The dibenzoate derivative of the glycol melts at 99° C. and the phenylurethane derivative at 170° C.

(D) *2,3 - dimethyl - 2,3 - bis(4 - hydroxymethylcyclohexyl)butane*.—p-Isopropylbenzoic acid is coupled by heating it with di-t-butyl peroxide at 140° C., yielding bicumic acid. Diethyl bicumate is prepared by esterifying the acid in mixed ethanol and sulfuric acid, after which the ester is hydrogenated over ruthenium oxide in accordance with the general procedure of part B, Example 1. The product, as shown by gas liquid chromatography, comprises a mixture of three geometrical isomers. Recrystallization of a portion of the product from methanol yields a pure isomer of diethyl dodecahydrobicumate having a melting point of 124° C. and identified as the "c,c"-isomer. Following the general procedure of part C of Example 1, a portion of the mixture of diethyl dodecahydrobicumates is saponified to the mixture of corresponding acids, following which the acid mixture is isomerized by heating it at one hour at 300° C. The solid acid remaining after extraction with boiling acetic acid is then esterified with mixed methanol and sulfuric acid, yielding a pure isomer of dimethyl dodecahydrobicumate having a melting point of 87° C. and identified as the "t,t"-isomer. Reduction of the ester produces a pure isomer of 2,3-dimethyl - 2,3 - bis(4 - hydroxymethylcyclohexyl)butane having a melting point of 161° C. and identified as the "t,t"-isomer of the glycol.

Recrystallization of the solute from the acetic acid extraction procedure from 65% aqueous acetic acid yields another isomer of dodecahydrobicumic acid. Esterification of this isomer in mixed methanol and sulfuric acid yields a 95% pure isomer of dimethyl dodecahydrobicumate having a melting point of 50° C. and identified as the "c,t"-isomer. Reduction of this ester produces an isomer of 2,3 - dimethyl - 2,3 - bis(4 - hydroxymethylcyclohexyl)butane having a melting point of 125° C. and identified as the "c,t"-isomer of the glycol. Reduction of diethyl "c,c" - dodecahydrobicumate correspondingly yields "c,c" - 2,3 - dimethyl - 2,3 - bis(4-hydroxymethylcyclohexyl)butane.

(E) *1,3 - bis(4 - hydroxymethylcyclohexyl)cyclohexane*.—Dimethyl 4,4″ - m - terphenyldicarboxylate is hydrogenated over ruthenium oxide, yielding a product which is a mixture of three isomers of 1,3-bis(4-carbomethoxycyclohexyl)cyclohexane, as determined by gas liquid chromatography. The mixed esters are saponified to form the corresponding mixture of acids, which is then isomerized at 250–300° C. for three hours and extracted with acetic acid. The insoluble acid is esterified with mixed methanol and sulfuric acid and the resulting ester, 1,3-bis(4 - carbomethoxycyclohexyl)cyclohexane, is recrystallized from aqueous methanol until it is 98% pure as shown by gas liquid chromatography. The ester has a melting point of 108° C. and is identified as the "t,c,t"-isomer. Reduction of the ester with lithium aluminum hydride gives 1,3 - bis(4 - hydroxymethylcyclohexyl)cyclohexane, having a melting point of 147° C. after three crystallizations from xylene and identified as the "t,c,t"-isomer of the glycol.

(F) *Bis(4 - hydroxymethylcyclohexyl)ether*. — Bis(4-carbomethoxyphenyl) ether is hydrogenated to form bis (4-carbomethoxycyclohexyl) ether by the method of part A of Example 1. The product is saponified, extracted with aqueous acetic acid to remove the various by-products, re-esterified with mixed methanol and sulfuric acid, and reduced with lithium aluminum hydride, yielding a liquid mixture of isomers of bis(4-hydroxymethylcyclohexyl) ether, after which the mixture is purified by distillation.

(G) *2,8 - bis(hydroxymethyl)dodecahydrodibenzofuran*.—Dimethyl 2,8-dibenzofurandicarboxylate is hydrogenated in accordance with the general procedure of part A of Example 1 to produce a mixture of geometrical isomers of dimethyl dodecahydrobibenzofuran - 2,8 - dicarboxylate. The mixed esters are reduced with lithium aluminum hydride to form a liquid mixture of 2,8-bis(hydroxymethyl)dodecahydrodibenzofuran isomers. The dibenzoate derivative of the glycol product, after trituration in heptane and recrystallization of the insoluble dibenzoate product from ethanol, has a melting point of 136° C.

(H) *Additional glycols*.—The starting material esters of Table I are reduced to the corresponding dodecahydro esters in accordance with the general procedure of part B of Example 1, after which lithium aluminum hydride reduction by the method of part G of Example 1 yields the corresponding glycols listed in the table.

The various starting material esters listed are available through procedure previously described in the art. The alkyl substituted bibenzoate esters are conveniently derived by the Ullmann method. For instance, 2,2'-dimethyl-5,5'-dicarbomethoxybiphenyl is prepared by the coupling of methyl 3-iodo-4-methylbenzoate as described by Kenner and Withan, J. Chem. Soc. 103, 237 (1913). The corresponding 2,2'-di-isopropyl derivative may be prepared similarly by diazotization of 3-aminocuminic acid followed by the Sandmeyer reaction and esterification to form methyl 3-iodo-4-isopropylbenzoate and subsequent coupling by the Ullmann method.

EXAMPLE 4

Poly(bicyclohexyl-4,4'-dimethylene 4,4'-bibenzoate)

Into a small polymer tube is placed 6.75 g. of dimethyl 4,4'-bibenzoate (0.025 mol), 12.45 g. of bis(4-hydroxymethylcyclohexyl) (0.055 mol) prepared as described in part G of Example 1 (mixed geometrical isomers), and 6 drops of an 8% solution of sodium hydrogen hexabutoxytitanate in n-butanol as a catalyst. The ingredients are melted and a capillary for nitrogen flow is inserted into the polymer tube. Ester exchange is carried out for 2.5 hours at 230° C. with evolution of methanol, after which the flow of inert gas is changed from nitrogen to xylene, the temperature is raised to 285° C., and vacuum is applied gradually until the pressure is reduced to 0.07 mm. of mercury. After 2.5 hours of polymerization at this temperature and pressure with a continuous slow stream of xylene maintained through the tube, the mixture is cooled and a white solid having an intrinsic viscosity of 0.56 is produced.

The polymeric material prepared as described above is crushed to a coarse powder and then heated for 4 hours under vacuum with a small bleed of nitrogen at 225° C. At the conclusion of this solid phase polymerization reaction, the intrinsic viscosity of the polymer is 0.65 and the polymer-melt temperature, PMT, is 255° C.

The term "intrinsic viscosity", as used herein, is defined as the limit of the fraction $\ln(r)/c$, as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

A molten sample of the poly(bicyclohexyl-4,4-dimethylene-4,4'-bibenzoate) product prepared by solid phase polymerization is extruded to form a filament, using conventional techniques. The undrawn filament has a $T_g$ of 97° C. The filament is oriented by drawing it around a pair of rolls between which is situated a heating block curved on each side and maintained at 150° C., using a draw ratio of 3×. The intrinsic viscosity of the polymer in the form of the oriented filament is measured and found to be 0.59. The residual elongation of the filament is 12%. The drawn filament is heat treated by boiling it in water for 15 minutes, heating it in an oven at 180° C. for 3 minutes, and finally immersing it in boiling water again for 15 minutes. The heat-treated filament has a tenacity of 1.9 g.p.d., and elongation of 16%, and an initial modulus of 41 g.p.d. Values for "tensile strain recovery" (TSR) and "moduli relaxation index" (MRI) are 74% and 0.05, respectively. The filament is insoluble in perchloroethylene and is oriented and crystalline as shown by X-ray diffraction patterns.

"$T_g$," the "second order transition temperature," is defined herein as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature. A convenient method for determining $T_g$ for a given sample of polymer is given by Pace in his U.S. Patent 2,556,295 (col. 3, line 24 to col. 4, line 19).

The TSR of a filament is determined by mounting a 10-inch length of the filament on a tensile tester with recording chart (commercially available from the Instron Engineering Corporation, Quincy, Mass.) and also equipped with a circulating water bath which can be raised and lowered. The water bath, maintained at 40° C., is raised to immerse the filament. After the filament has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the filament is then reduced to a value of 0.042 g.p.d. and the filament is allowed to retract. Percent recovery is calculated from the formula:

$$\frac{\text{Units of retraction}}{\text{Units of elongation}} \times 100\%$$

This procedure is carried out for elongations of 0.5, 1, 2, and 3%, and a graph is prepared by plotting the percent recovery against total elongation in the range 0–3%. TSR values are average percent recovery values from the range 0–3% elongation which may be determined from the graph by usual graphical averaging procedures.

Filaments having TSR values of 60% are considered to have good tensile recovery, while filaments exhibiting TSR values of 70% and above are considered quite superior.

The MRI of a filament is determined by mounting a 10-inch length of the filament on a tensile tester of the above type, except that the tester is additionally equipped with a tube heater surrounding the filament. The filament is first heated for 4 minutes at 70° C. with the tube heater, after which it is stretched while hot to an extension of 1% ±0.05%. Upon reaching 1% elongation, the sample is held at constant length for about 1 minute, still at 70° C., during which time the force required to maintain the filament at this extension is recorded on the chart. The cross head of the tensile tester is then returned to its original position, leaving the filament with a small amount of slack. The circulating water bath, maintained at 70° C., is raised so that the filament is submerged. After the sample has been heated in water for 4 minutes at this temperature, the slack is taken up and the sample is stretched again to 1% ±0.05% elongation. The cross head is then finally returned again to its original position. Data is then taken from the chart of the tensile tester to calculate the dry and wet moduli and the loss factor, as follows:

$$G_{(dry)} = \frac{F_a}{\text{denier}} \times \frac{100}{\text{percent extension}}$$

$$G_{(wet)} = \frac{F_a'}{\text{denier}} \times \frac{100}{\text{percent extension}}$$

$$L = \frac{F_a - F_b}{F_a}$$

$$MRI = \frac{G_{(dry)}}{G_{(wet)}} \times L$$

where $G_{(dry)}$ is the dry modulus and $G_{(wet)}$ is the wet modulus, $F_a$ is the initial force required to achieve 1% elongation in the dry filament and $F_a'$, is the initial force required to achieve 1% elongation in the wet filament, $F_b$ is the force required to maintain the dry filament at constant 1% elongation 45 seconds after 1% elongation is initially achieved, and L is the loss factor. Low values of MRI are indicative of a high predicted fabric recovery, especially values below 0.2. Comparative MRI values for commercial 6—6 nylon and polyethylene terephthalate fibers are 0.9 and 0.2, respectively.

EXAMPLE 5

Copolyester fibers and films of improved dyeability with basic dyes

The procedure described in Example 4 for preparation of poly(bicyclohexyl-4,4'-dimethylene 4,4'-bibenzoate) is repeated, substituting in place of the dimethyl 4,4'- bibenzoate a mixture of 0.0243 mol of dimethyl 4,4'-bibenzoate and 0.0007 mol of sodium 3,5 - di(carbomethoxy)benzenesulfonate. The product, poly[bicyclohexyl - 4,4' - dimethylene 4,4'-bibenzoate/5-(sodium sulfo)isophthalate], 97/3 mol per cent, yields a clear, tough, drawable film which exhibits greatly enhanced dyeability with Fuchsine SBP dye (C.I. 42,510) and other basic dyes as contrasted with a film of the corresponding homopolyester of Example 4, which has virtually no affinity for these basic dyes. Orientable fibers dyeable with basic dyes can be pulled from the copolyester melt.

In the following examples, dimethyl 4, 4'bibenzoate is polycondensed with various glycols using the same molar ratio of reactants and the same general procedure for melt polymerization described in Example 4. Also included are examples of various copolyesters prepared by substituting a portion of the dimethyl 4,4'-bibenzoate with the corresponding molar amount of the designated dimethyl ester.

4,4'-BIBENZOATE POLYESTERS AND COPOLYESTERS

| Ex. No. | Glycol Employed | PMT, (° C.) | Intrinsic viscosity |
|---|---|---|---|
| 6 | "c,c"-Bis(4-hydroxymethylcyclohexyl) | 275 | 0.6 |
| 7 | "c,t"-Bis(4-hydroxymethylcyclohexyl) | 225 | 0.7 |
| 8 | "t,t"-Bis(4-hydroxymethylcyclohexyl) | 375 | (insol.) |
| 9 | "c,c"-Bis(4-hydroxymethylcyclohexyl)methane. | 200 | 0.53 |
| 10 | "t,t"-Bis(4-hydroxymethylcyclohexyl)methane. | 300 | 0.4 |
| 11 | 25%"c,c"-/75%"t,t"-bis(4-hydroxymethylcyclohexyl)methane. | 285 | 0.54 |
| 12 | "c,c"-2,2-bis(4-hydroxymethylcyclohexyl)propane. | 275 | 0.63 |
| 13 | "t,t"-2,2-bis(4-hydroxymethylcyclohexyl)propane. | 195 | 0.8 |
| 14 | "c,c"-1,2-bis(4-hydroxymethylcyclohexyl)ethane. | 210 | 0.81 |

4,4' BIBENZOATE POLYESTERS AND COPOLYESTERS

| Ex. No. | Glycol Employed | PMT (°C.) | Intrinsic viscosity |
|---|---|---|---|
| 15 | "c,t"-2,3-dimethyl-2,3-bis(hydroxymethylcyclohexyl)butane. | 165 | 0.33 |
| 16 | "t,t"-2,3-dimethyl-2,3-bis(hydroxymethylcyclohexyl)butane. | 255 | 0.54 |
| 17 | "t,t"-1,3-bis(4-hydroxymethylcyclohexyl)propane. | 240 | 0.5 |
| 18 | "c,syn,c"-bis(3-hydroxymethylcyclohexyl). | 220 | 0.40 |
| 19 | Bis(2-hydroxymethylcyclohexyl). | 165 | 0.24 |
| 20 | Bis(4-hydroxymethylcyclohexyl) ether. | 160 | 0.50 |
| 21 | 2,8-bis(hydroxymethyl)dodecahydrodibenzofuran. | [1] >300 | (insol.) |
| 22 | "t,c,t"-1,3-bis(4-hydroxymethylcyclohexyl)cyclohexane. | 245 | 0.38 |
| 23 | "t,t"-Bis(4-hydroxymethylcyclohexyl); copolyester from 25% dimethyl 4,4'-bibenzoate/75% dimethyl dodecahydro-4,4'-bibenzoate. | 304 | 0.86 |
| 24 | 40%"c,t"-/60%"t,t"-bis(4-hydroxymethylcyclohexyl); copolyester from 75% dimethyl 4,4'-bibenzoate/25% dimethyl dodecahydro-4,4'-bibenzoate. | 300 | 0.93 |
| 25 | 40%"c,t"-/60%"t,t"-bis(4-hydroxymethylcyclohexyl); copolyester from 65% dimethyl 4,4'-bibenzoate/35% dimethyl dodecahydro-4,4'-bibenzoate. | 283 | 0 80 |
| 26 | 40%"c,t"-/60%"t,t-"bis(4-hydroxymethylcyclohexyl); copolyester from 75% dimethyl 4,4'-bibenzoate/25% dimethyl 5-t-butylisophthalate. | 215 | 0.45 |
| 27 | 40%"c,t"-/60%"t,t"-bis(4-hydroxymethylcyclohexyl); copolyester from 75% dimethyl 4,4'-bibenzoate/25% 2,2-bis(4-carbomethoxycyclohexyl)propane. | 300 | 0.98 |

[1] With decomp.

The polymer of Example 7, when subjected to solid phase polymerization by heating it under vacuum with a small bleed of nitrogen at 220° C. for one hour and then at 240° C. for 3 hours, has a PMT of 260° C. Under similar conditions, the melting point of polymer of Example 6 rises to 295° C.

The polymer of Example 13, when crystallized by treating it with methylene chloride and drying it, has a PMT of 260° C.

Drawn filaments of Example 9 have a tenacity of 0.7 g.p.d., an elongation of 10%, an initial modulus of 21 g.p.d., a TSR of 59%, and an MRI of 0.25. Corresponding values for drawn filaments of other examples are as follows: Example 11, 0.6 g.p.d., 3.8%, 22 g.p.d., TSR of 74%, and MRI of 0.04; Example 14, 1.5 g.p.d., 11%, 45 g.p.d., TSR of 72%, and MRI of 0.17; Example 23, 0.8 g.p.d., 8.7%, and 14 g.p.d.; and Example 24, 1.3 g.p.d., 9.5%, and 26 g.p.d. The fibers from Example 24 exhibit good dyeability with 1,4-diamino-2,3-dichloroanthraquinone (a violet disperse dye). Flexible films are melt pressed from the polyesters of Examples 16 and 22. A disc of excellent toughness is molded from the polyester of Example 14. Tough, molded discs are also prepared from the polyesters of Examples 15, 18, 19, and 20.

In the following examples, dimethyl 4,4'-sulfonyldibenzoate is polycondensed with various glycols in general accordance with the procedure described in Example 4:

4,4'-SULFONYLDIBENZOATE POLYESTERS

| Ex. No. | Glycol employed | PMT (°C.) | Intrinsic viscosity |
|---|---|---|---|
| 28 | 75%"c,c"-/25%"c,t"-bis(4-hydroxymethylcyclohexyl). | 195 | 0.40 |
| 29 | "t,t"-1,2-bis(4-hydroxymethycyclohexyl)ethane. | 310 | (insol.) |
| 30 | "c,syn,c"-Bis(3-hydroxymethylcyclohexyl). | 190 | 0.51 |

In the following examples, dimethyl terephthalate (0.03 mol) is polycondensed with various glycol (0.06 mol) in general accordance with the melt polymerization method of Example 4. In Example 42, a copolyester is prepared by replacing 25% of the dimethyl terephthalate with the corresponding molar amount of dimethyl hexahydroterephthalate.

TEREPHTHALATE POLYESTER AND COPOLYESTERS

| Ex. No. | Glycol employed | PMT (°C.) | Intrinsic viscosity |
|---|---|---|---|
| 31 | "c,c"-Bis(4-hydroxymethylcyclohexyl). | 220 | 0.5 |
| 32 | "t,t"-Bis(4-hydroxymethylcyclohexyl). | 293 | (insol.) |
| 33 | 40%"c,t"-/60%"t,t"-bis(4-hydroxymethylcyclohexyl). | >300 | 0.4 |
| 34 | "c,c"-Bis(4-hydroxymethylcyclohexyl)methane. | 130 | 0.47 |
| 35 | "t,t"-Bis(4-hydroxymethylcyclohexyl)methane. | 280 | (insol.) |
| 36 | "c,c"-1,2-Bis(4-hydroxymethylcyclohexyl)ethane. | 180 | 0.50 |
| 37 | "t,t"-1,2-bis(4-hydroxymethylcyclohexyl)ethane. | 300 | (insol.) |
| 38 | "c,c"-2,2-bis(4-hydroxymethylcyclohexyl)propane. | 255 | 0.87 |
| 39 | "t,t"-2,2-bis(4-hydroxymethylcyclohexyl)propane. | 320 | (insol.) |
| 40 | "t,t"-1,3-bis(4-hydroxymethylcyclohexyl)propane. | 180 | 0.4 |
| 41 | "c,syn,c"-Bis(3-hydroxymethylcyclohexyl). | 330 | (insol.) |
| 42 | 40%"c,t"-/60%"t,t"-bis(4-hydroxymethylcyclohexyl); copolyester from 75% dimethyl terephthalate/25% dimethyl hexahydroterephthalate. | 246 | 0.49 |

The polymer of Example 31 is extruded at 265° C. to form a filament, using conventional techniques. The filament is oriented by drawing it 3× over a 90° C. pin. The drawn filament is oriented but amorphous as shown by X-ray diffraction patterns. The drawn filament is heat treated by boiling it in water for 15 minutes, heating it in an oven at 160° C. for 3 minutes, and finally immersing it in boiling water again for 3 minutes. The heat-treated filament is oriented and crystalline as shown by X-ray diffraction patterns. It has a tenacity of 0.9 g.p.d., an elongation of 5%, and an initial modulus of 34 g.p.d. Values for TSR and MRI, as defined in Example 4, are 71% and 0.14, respectively.

In each of the following examples, the designated dimethyl esters are polycondensed with the designated glycols in general accordance with the procedure described in Example 4:

METHYLENE-4,4'-DIBENZOATE POLYESTERS

| Ex. No. | Prepared from dimethyl methylene-4,4'-dibenzoate and the following glycol— | PMT (°C.) | Intrinsic viscosity |
|---|---|---|---|
| 43 | "t,t"-Bis(4-hydroxymethylcyclohexyl). | 170 | 0.43 |
| 44 | "t,t"-Bis(4-hydroxymethylcyclohexyl)methane. | 240 | 0.70 |

The poly("t,t"-bicyclohexyl-4,4'-dimethylene methylene-4,4'-dibenzoate) of Example 43 is relatively amorphous when cooled from the melt; however, it can be crystallized by treating it with methylene chloride and then drying it.

1,2-ETHYLENE-4,4'-DIBENZOATE POLYESTERS

| Ex. No. | Prepared from dimethyl 1,2-ethylene-4,4'-dibenzoate and the following glycol— | PMT (°C.) | Intrinsic viscosity |
|---|---|---|---|
| 45 | 75%"c,c"-/25%"c,t"-bis(4-hydroxymethylcyclohexyl). | 181 | 0.3 |
| 46 | 40%"c,t"-/60%"t,t"-bis(4-hydroxymethylcyclohexyl). | 215–225 | 0.44 |
| 47 | "t,t"-Bis(4-hydroxymethylcyclohexyl). | 281 | 0.72 |
| 48 | "t,t"-Bis(4-hydroxymethylcyclohexyl)methane. | 245 | 0.77 |
| 49 | "c,c"-1,2-bis(4-hydroxymethylcyclohexyl)ethane. | 145 | 0.3 |
| 50 | "t,t"-1,2-bis(4-hydroxymethylcyclohexyl)ethane. | 225 | 1. |

The poly("t,t" - 1,2 - ethylene - bis[cyclohexyl - 4-methylene] 1,2 - ethylene - 4,4' - dibenzoate) of Example 50 is crushed to a coarse powder and then heated under vacuum with a small bleed of nitrogen for 0.5 hour at 200° C., 0.5 hour at 210° C., 0.5 hour at 220° C., 1 hour at 230° C., 2.5 hours at 240° C., and 0.5 hour at 225° C.

The PMT of the resulting polymer is 255° C. and the intrinsic viscosity is 1.0. The solid phase polymerized polymer is extruded at 290° C. to form a filament, using conventional techniques. The filament is oriented by drawing it 3.6× over a 127° C. pin. The drawn filament is heat treated by boiling it in water for 15 minutes, heating it in an oven at 180° C. for 3 minutes, and finally immersing it in boiling water again for 3 minutes. The heat-treated filament is oriented and crystalline as shown by X-ray diffraction patterns. It has a tenacity of 2.3 g.p.d., an elongation of 28%, and an initial modulus of 26 g.p.d. Values for TSR and MRI, as defined in Example 4, are 69% and 0.074, respectively.

Oriented fibers are also prepared from the polyester of Example 47. They have a tenacity of 0.6 g.p.d., an elongation of 15.5%, and an initial modulus of 18.5 g.p.d. Oriented fibers prepared from the polyester of Example 48 are tested for TSR and MRI and values for these parameters are found to be 69% and 0.03, respectively. Flexible films are melt pressed from the polyesters of Examples 45 and 49. The latter two polyesters are also molded to form tough discs.

EXAMPLE 51

Poly(bicyclohexyl-4,4'-dimethylene adamantane-1,3-dicarboxylate)

Into a small polymer tube is placed 5.05 g. of dimethyl adamantane-1,3-dicarboxylate (0.02 mol), 7.7 g. of "t,t"-bis(4-hydroxymethylcyclohexyl) (0.034 mol), and 4 drops of an 8% solution of sodium hydrogen hexabutoxytitanate in n-butanol. Using the general procedure of Example 4, ester exchange is carried out for 2 hours at 220° C. and polycondensation is subsequently performed at 250–280° C. for 3.5 hours under vacuum. The PMT of the resulting solid is 110° C. The melting point of the polymer rises to 205° C. when it is crystallized by treating the polymer with methylene chloride and drying it.

The crystallized polymer is subjected to solid phase polymerization by heating it under vacuum with a small bleed of nitrogen beginning at 200° C. and slowly raising the temperature to 240° C. over a period of several hours. The PMT of the resulting polymer is 230° C. and the intrinsic viscosity is 0.4. Orientable fibers can be prepared from the melt.

EXAMPLE 52

Poly(bicyclohexyl-4,4'-dimethylene decahydronaphthalene-2,6-dicarboxylate)

Into a small polymer tube is placed 4.0 g. of dimethyl decahydronaphthalene - 2,6 - dicarboxylate (0.016 mol), 7.2 g. of "t,t" - bis(4 - hydroxymethylcyclohexyl) (0.032 mol), and 3 drops of an 8% solution of sodium hydrogen hexabutoxytitanate in n-butanol. Melt polymerization is carried out in the manner of Example 4, yielding a polymer having a PMT of 125° C. and an intrinsic viscosity of 0.4. Flexible films are melt pressed from the polymer.

EXAMPLE 53

Poly(bicyclohexyl-4,4'-dimethylene dodecahydro-4,4'-bibenzoate)

This polyester is prepared by the general procedure for melt polycondensation as in Example 4 by the reaction of dimethyl dodecahydro - 4,4' - bibenzoate with "t,t" - bis(4-hydroxymethyl)cyclohexyl. The polyester has a PMT of 237° and an intrinsic viscosity of 0.44. Orientable fibers are prepared from the melt.

EXAMPLE 54

Poly(bicyclohexyl-4,4'-dimethylene 1,3-propylene-4,4'-bibenzoate)

This polyester is prepared by melt polycondensation as in Example 4 from dimethyl 1,3-propylene-4,4'-dibenzoate and "t,t"-bis(4-hydroxymethylcyclohexyl). It is a useful molding material having a PMT of 160° C. and an intrinsic viscosity of 0.43.

EXAMPLE 55

Poly(bicyclohexyl-4,4'-dimethylene isopropylidene-4,4-dibenzoate)

This polyester is prepared by melt polycondensation as in Example 4 from dimethyl isopropylidene-4,4'-dibenzoate and "t,t"-bis(4-hydroxymethylcyclohexyl). Its PMT is 165–195° C. and its intrinsic viscosity is 0.31.

EXAMPLE 56

Poly(bicyclohexyl-4,4'-dimethylene 1,2-ethylene-bis[4-oxybenzoate])

This polyester is prepared by melt polycondensation as in Example 4, with solid phase polymerization at 240° C. for 17 hours, from "t,t"-bis(4-hydroxymethylcyclohexyl) and 1,2-bis(4-carbomethoxyphenoxy)ethane. Its PMT is 283° C. and its intrinsic viscosity is 0.77. Fibers spun and drawn in the conventional manner have a tenacity of 2.0 g.p.d., an elongation of 18%, and an initial modulus of 28 g.p.d.

EXAMPLE 57

Poly(bicyclohexyl-4,4'-dimethylene 2,5-dimethylterephthalate)

This polyester is prepared by melt polycondensation as in Example 4 from dimethyl 2,5-dimethylterephthalate and bis(4-hydroxymethylcyclohexyl) prepared as described in part G of Example 1 (mixed geometrical isomers). Its PMT is 130° C. and its intrinsic viscosity is 0.37.

EXAMPLE 58

Poly(bicyclohexyl-4,4'-dimethylene glutarate)

This polyester is prepared by melt polycondensation as in Example 4 from dimethyl glutarate and "t,t"-bis(4-hydroxymethylcyclohexyl). Its PMT is 139° C. and its intrinsic viscosity is 0.63. Samples of the polyester are melt pressed to form flexible films and are molded into discs exhibiting excellent toughness.

EXAMPLE 59

Segmented copolyesters of poly(bicyclohexyl-4,4'-dimethylene 4,4-bibenzoate) and poly(2-methyl-2-ethyl-1,3-propylene terephthalate)

A mixture of 35.5 g. of 2-methyl-2-ethyl-1,3-propanediol (0.3 mol), 19.4 g. of dimethyl terephthalate (0.1 mol) and 1.0 ml. of a catalyst solution of 8% sodium hydrogen hexabutoxytitanate in n-butanol is heated at 190–210° C. at atmospheric pressure for 5 hours with evolution of methanol. The pressure is then reduced to 0.7 mm. of mercury while the temperature is maintained at 210° C., following which polycondensation is carried out for 24 hours at this temperature and pressure. The product, poly-(2-methyl-2-ethyl-1,3-propylene terephthalate), has an intrinsic viscosity of 0.5 and a PMT of 104° C.

Dimethyl 4,4'-bibenzoate is reacted with 61% "c,c"-/35% "c,t"-/4% "t,t"-bis(4-hydroxymethylcyclohexyl) as in in Example 4 to form poly(bicyclohexyl-4,4'-dimethylene 4,4'-bibenzoate) having an intrinsic viscosity of 0.61 and a PMT of 290° C. Eighty g. of the polymer is mixed with 20 g. of the poly(2-methyl-2-ethyl-1,3-propylene terephthalate) in a 150-ml. round-bottom flask fitted with a glass stirrer and a nitrogen inlet. The flask is blanketed with nitrogen and heated to 300° C. After stirring for 10 minutes at this temperature and an additional 20 minutes at 320° C., the flask is allowed to cool. A segmented copolyester is obtained having an intrinsic viscosity of 0.45. The segmented copolyester is pulverized and heated at 220° C. and 0.2 mm. of mercury for 11 hours with a continuous slow stream of nitrogen gas passed through the powder from a capillary. The product has an intrinsic viscosity of 0.64 and a PMT of 233° C. Oriented fibers prepared from the polymer have a tenacity of 1.3 g.p.d., an elongation of 25%, an initial modulus of 23 g.p.d., a TSR of 67%, and an MRI of 0.17.

Another segmented copolyester is prepared, employing a 60% to 40% ratio by weight of the two polyesters instead of the 80% to 20% ratio used above. In this instance a 40% "c,t"-, 60% "t,t"- isomer mixture of bis-(4-hydroxymethylcyclohexyl) is used to prepare the poly-(bicyclohexyl-4,4'-dimethylene 4,4'-bibenzoate), which has a PMT of 305° C. and an intrinsic viscosity of 0.41; and 21 g. of this polymer is mixed with 14 g. of the poly-(2-methyl-2-ethyl-1,3-propylene terephthalate). The mixture of polyesters is heated at 350° C. for 35 minutes with stirring, and the flask is then allowed to cool. The segmented copolyester has an intrinsic viscosity of 0.25 and a PMT of 170° C.

EXAMPLE 60

Segmented copolyester of poly(bicyclohexyl-4,4'-dimethylene 4,4'-bibenzoate) and poly(2-methyl - 2 - ethyl-1,3-propylene azelate)

A mixture of 108 g. of dimethyl azelate (0.5 mol) and 153 g. of 2-methyl-2-ethyl-1,3-propandiol (1.3 mol) are heated with 0.4 g. tetrabutyl titanate at 170–200° C. for 3.5 hours under nitrogen with the evolution of methanol. The pressure is then reduced to 0.5 mm. of mercury and the temperature increased to 245° C. during a period of 35 minutes, following which polycondensation is carried out for 24 hours at this temperature and pressure. The product, poly(2-methyl-2-ethyl-1,3-propylene azelate), is liquid and has an inherent viscosity of 1.3. 2.8 g. (10 wt. percent) of this polyester is then mixed with 25 g. (90 wt. percent) of poly(bicyclohexyl-4,4'-dimethylene-4,4'-bibenzoate) having a PMT of 275° C. and an intrinsic viscosity of 0.70, prepared from dimethyl 4,4'-bibenzoate and 74% "c,t"-/26% "t,t"-bis(4 - hydroxymethylcyclohexyl). The mixture of polyesters is heated for 10 minutes at 310° C. with stirring, after which the flask is cooled. The segmented copolyester has an intrinsic viscosity of 0.60 and a PMT of 248° C.

EXAMPLE 61

Segmented copolyester of poly(bicyclohexyl-4,4'-dimethylene 4,4'-bibenzoate) and poly(ethylene 2,5-dimethylterephthalate)

Forty-four g. of dimethyl 2,5-dimethylterephthalate (0.198 mol) is mixed with 37 g. (0.596 mol) of ethylene glycol in the presence of 0.1 g. of tetrabutyl titanate in 2 ml. of butanol. The mixture is heated at 180°–190° C. for 3 hours with evolution of methanol. The pressure is then reduced to 0.6 mm. of mercury while the temperature is increased to 280° C., following which polycondensation is carried out for 6.5 hours at this temperature and pressure. The product, polyethylene 2,5-dimethylterephthalate, has an inherent viscosity of 0.34 and a PMT of 92° C. Ten g. (20 wt. percent) of this polyester is then mixed with 40 g. (80 wt. percent) of poly(bicyclohexyl-4,4'-dimethylene 4,4'-bibenzoate) having a PMT of 278° C. and an intrinsic viscosity of 0.77, prepared from dimethyl, 4,4'-bibenzoate and 58% "c,t"-/42% "t,t"-bis(4-hydroxymethylcyclohexyl). The mixture of polyesters is heated for 47 minutes at 290° C. with stirring, after which the flask is cooled. The segmented copolyester has an intrinsic viscosity of 0.46 and a PMT of 270° C.

EXAMPLE 62

Segmented copolyester of polyethylene terephthalate and poly(bicyclohexyl-4,4'-dimethylene 2,5-dimethylterephthalate)

Polyethylene terephthalate is prepared from a mixture of 4540 g. (23.2 mols) of dimethyl terephthalate, 3064 g. of ethylene glycol (49.4 mols), 13.6 g. of antimony troxide, and 20.4 g. of manganous acetate (4.5 H₂O) by heating at 160°–320° C. for 2 hours at atmospheric pressure and then at 266°–283° C. for 3 hours while the pressure is reduced to 1.8 mm. of mercury. The product has a PMT of 255° C. and an intrinsic viscosity of 0.68.

Forty g. (80 wt. percent) of polyethylene terephthalate is mixed with 10.0 g. (20 wt. percent) of the poly-(bicyclohexyl-4,4'-dimethylene 2,5-dimethylterephthalate) of Example 57. The mixture of polyesters is heated for 30 minutes at 280° C. with stirring, after which the flask is cooled. The segmented copolyester has an intrinsic viscosity of 0.66 and a PMT of 242° C.

EXAMPLE 63

Polyesteramide of bis(4-hydroxymethylcyclohexyl), 4,4'-bibenzoic acid, terephthalic acid, and hexamethylenediamine Into a small polymer tube are placed 4.40 g. (0.01 mol) of N,N' - bis(4-carbomethoxybenzoyl)hexamethylenediamine, prepared by reacting the half methyl ester, half acid chloride of terephthalic acid with hexamethylenediamine; 10.81 g. (0.04 mol) of dimethyl 4,4'-bibenzoate; 11.88 g. (0.0525 mol) of 58% "c,c"-/36% "c,t"-/6% "t,t"-bis(4 - hydroxymethylcyclohexyl); and, as a catalyst, 0.5 ml. of an 8% solution of sodium hydrogen hexabutoxytitanate in n - butanol. The tube is heated and a capillary flow of nitrogen is commenced. The reaction is carried out under atmospheric pressure at 200° C. for 10 minutes, at 225° C. for 20 minutes, and at 258° C. for 40 minutes, after which the pressure is reduced to 0.3 mm. of mercury and the tube is heated at 285° C. for 3 hours. The molten polyesteramide is colorless and very viscous. After cooling, the product has a PMT of 259° C. and an intrinsic viscosity of 0.99. Fibers melt-spun at 320° C. and drawn 3.3× are found to have a tenacity of 2.5 g.p.d., an elongation of 14%, a modulus of 50 g.p.d., and a TSR of 68.5%.

EXAMPLE 64

Polyesteramide of bis(4-hydroxymethylcyclohexyl), terephthalic acid, and hexamethylenediamine Into a small polymer tube are placed 13.21 g. (0.03 mol) of N,N'-bis(4-carbomethoxybenzoyl)hexamethylenediamine, 7.13 g. (0.0315 mol) of 48% "c,c"-/44% "c,t"-/8% "t,t"-bis(4 - hydroxymethylcyclohexyl), and, as a catalyst, 0.3 ml. of an 8% solution of sodium hydrogen hexabutoxytitanate in n-butanol. The tube is heated and a capillary flow of nitrogen is commenced. The reaction is carried out at atmospheric pressure at 200° C. for 10 minutes, at 225–235° C. for 40 minutes, and at 285° C. for 40 minutes; after which the pressure is reduced to 0.3 mm. of mercury and the temperature is maintained at 285° C. for 3 hours. The polyesteramide product has a PMT of 174° C. and an intrinsic viscosity of 0.61. Orientable fibers are pulled from the melt.

EXAMPLE 65

Polyesteramide of bis(4-hydroxymethylcyclohexyl), hexamethylenediamine, and 4,4-bibenzoic acid Into a 3-neck flask equipped with a mechanical stirrer, a thermometer, and a reflux condenser are placed 13.5 g. (0.05 mol) of dimethyl 4,4'-bibenzoate, 22.6 g. (0.1 mol) of 58% "c,c"-/36% "c,t"-/6% "t,t"-bis(4-hydroxymethylcyclohexyl), 3.7 g. of 79% aqueous hexamethylenediamine (0.025 mol of amine), and 25 ml. of n-butanol. The mixture is heated and stirred at 110° C. for 46 hours, after which the reflux condenser is replaced with a distilling head and 27.0 g. (0.1 mol) additional dimethyl 4,4'-bibenzoate is added together with 34.0 g. (0.15 mol) of the bis(4-hydroxymethylcyclohexyl). The temperature is increased to 175° C. and maintained there until distillation ceases, after which 2.7 ml. of 14.4% tetrabutyltitanate in n-butanol is added. The mixture is then heated at 225° C. at atmospheric pressure for 60 minutes, after which the pressure is reduced to 0.3 mm. of mercury and the temperature is increased to 285° C.

for 2 hours. The product has a PMT of 271° C. and an intrinsic viscosity of 0.38.

Since many different embodiments of the invention may be made without departing from the spirit and scope thereof, it to be understood that the invention is not limited by the specific illustrations except to the extent defined in the following claims.

I claim:
1. A crystalline linear polymeric fiber-forming polyester consisting essentially of recurring units of the following structural formula:

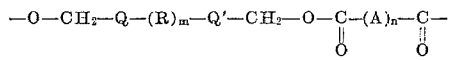

wherein $m$ is 0 or 1, $n$ is 1, Q and Q' are saturated divalent hydrocarbon radicals of the group consisting of 1,3-cyclohexylene, 1,4-cyclohexylene, and lower alkyl derivatives thereof; R is an alkylene radical of up to 8 carbon atoms of which at most 4 carbon atoms are in the chain connecting Q and Q'; and A represents divalent hydrocarbon radicals selected from the group consisting of arylene, aralkylene or cycloalkylene radicals of up to 24 carbon atoms having the indicated carbonyl substituents attached directly to nuclear carbon atoms with the carbonyl substituents separated by a chain of at least three nuclear carbon atoms; said recurring units consisting essentially of units in which the radical A includes two 6-membered carbocyclic nuclei.

2. Fiber-forming polymeric polyester of a mixture consisting essentially of a bis(4-hydroxymethylcyclohexyl) alkane of 15 to 18 carbon atoms and 4,4'-bibenzoic acid.

3. Fiber-forming polymeric polyester of a mixture consisting essentially of bis(4-hydroxymethylcyclohexyl) and dodecahydro-4,4'-bibenzoic acid.

4. Fiber-forming polymeric polyester of a mixture consisting essentially of bis(4-hydroxymethylcyclohexyl) and 4,4'-bibenzoic acid/decahydro-4,4'-bibenzoic acid in the proportions of 90/10 to 25/75.

5. Fiber-forming polymer consisting essentially of poly(bicyclohexyl-4,4'-dimethylene 4,4'-bibenzoate).

6. The polymer of claim 1 in the form of a film.

7. The polymer of claim 1 in the form of a fiber.

8. Fiber-forming polymeric polyester of a mixture consisting essentially of bis(4-hydroxymethylcyclohexyl) methane and methylene-4,4'-dibenzoic acid.

9. Fiber-forming polymeric polyester of a mixture consisting essentially of bis(4-hydroxymethylcyclohexyl) ethane and ethylene-4,4'-dibenzoic acid.

10. The polymer of claim 1 which is a polyester of bis(4-hydroxymethylcyclohexyl) and a dicarboxylic acid component comprising at least 75 mol percent of 4,4'-bibenzoic acid.

11. The polymer of claim 5 in the form of a fiber.

References Cited
UNITED STATES PATENTS 3,227,682   1/1966   Hornbaker _____ 260—75

WILLIAM H. SHORT, Primary Examiner

L. P. QUAST, Assistant Examiner

U.S. Cl. X.R.
260—47, 63, 178, 617